T. MOCYDLARZ.
LAMP SIGNAL FOR AUTOMOBILES.
APPLICATION FILED DEC. 23, 1913.
1,133,305.
Patented Mar. 30, 1915.
2 SHEETS—SHEET 1.
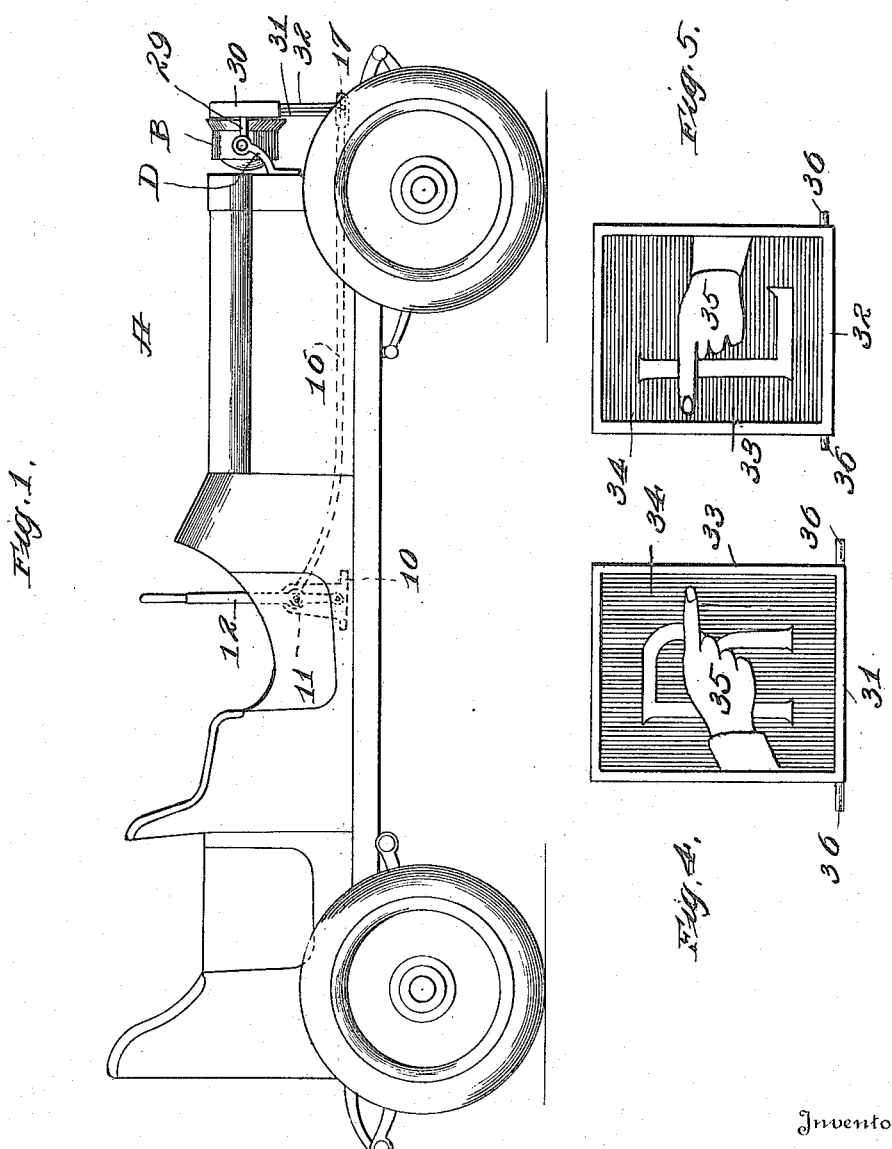

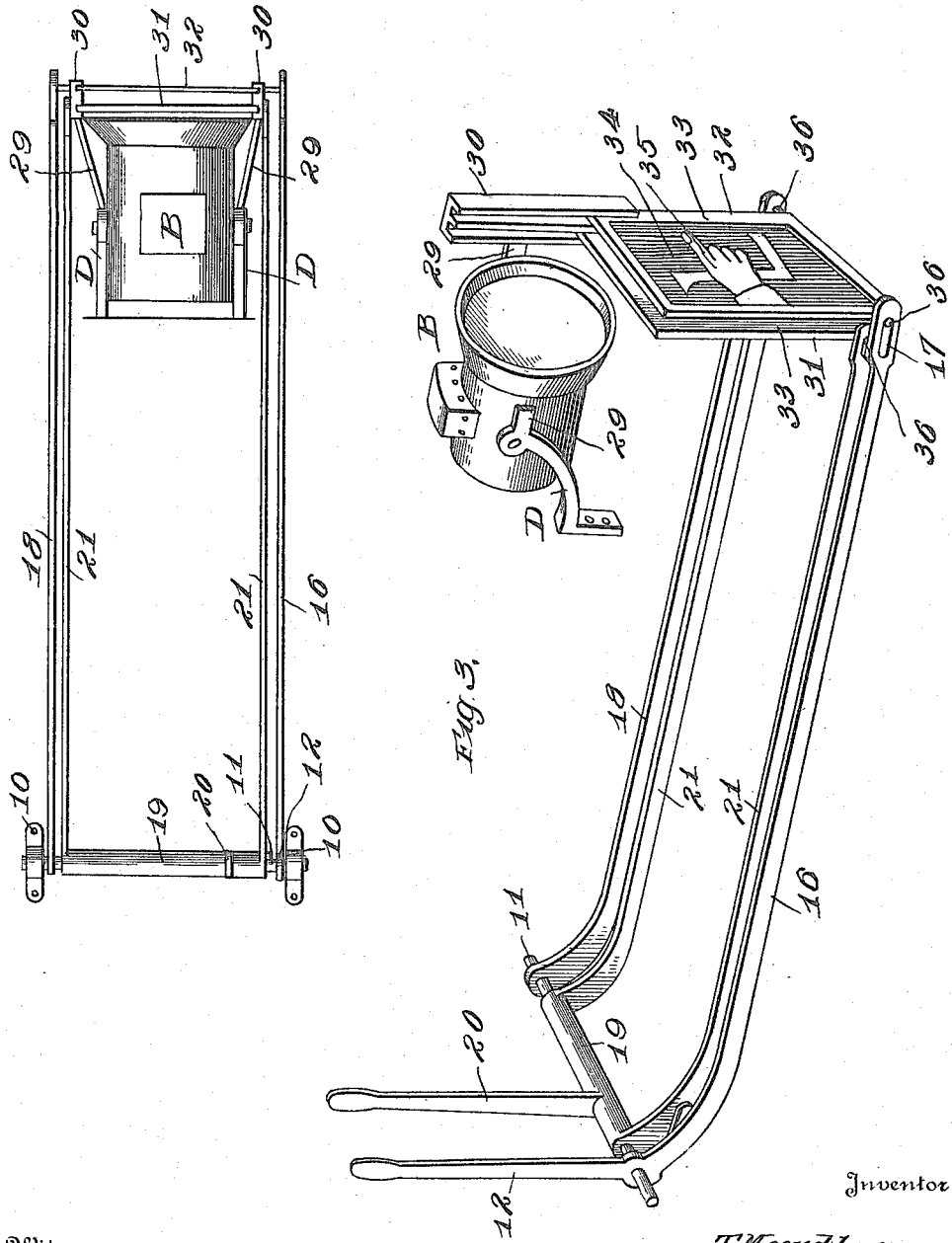

UNITED STATES PATENT OFFICE.

THOMAS MOCYDLARZ, OF STRATHCONA, ALBERTA, CANADA.

LAMP-SIGNAL FOR AUTOMOBILES.

1,133,305.  Specification of Letters Patent.  Patented Mar. 30, 1915.

Application filed December 23, 1913. Serial No. 808,359.

*To all whom it may concern:*

Be it known that I, THOMAS MOCYDLARZ, a subject of the King of Prussia, residing at Strathcona, Alberta, Canada, have invented certain new and useful Improvements in Lamp-Signals for Automobiles, of which the following is a specification.

This invention relates to certain new and useful improvements in lamp signals for automobiles.

An object of the invention is to provide an automobile of usual construction, with manually operated means to designate the contemplated change in direction of travel, *i. e.*, to either the right or left, to warn drivers and pedestrians in front of the automobile.

With the above and other objects in view, as will appear as the nature of the invention is better understood, the same consists in the novel construction and arrangement of parts to be hereinafter more fully described and then claimed, reference being had to the accompanying drawings by like characters throughout the several views and wherein:—

Figure 1 is a side elevational view of an automobile embodying my invention. Fig. 2 is a top plan view of the signal mechanism removed from the automobile. Fig. 3 is a perspective view of the same, and, Figs. 4 and 5 are rear elevational views of the direction indicating slides.

Referring more specifically to the drawings, the reference letter A designates an automobile of usual construction, and as shown in Fig. 1, with my invention applied thereto.

The signal mechanism which constitutes my invention, and which is clearly shown in Figs. 2 and 3 comprises more specifically a pair of supporting standards 10 mounted on the automobile A adjacent the front seat thereof. Journaled in said standards 10 is a transverse shaft 11 and keyed to said shaft 11 adjacent one end thereof is an operating lever 12. A forwardly-extending arm 16 is formed at its rear end, integral with the operating lever, and is provided with an elongated slot 17 formed in an enlarged portion of the forward end thereof. An arm 18 similar to the arm 16 and disposed in a plane parallel thereto is fixedly secured to the opposite end of the shaft 11 and is similarly slotted at its forward end. Loosely-mounted on the shaft 11 is a sleeve member 19 provided with a vertically-disposed integral operating lever 20, and formed integral with the sleeve member 19 at each end thereof is a pair of forwardly-extending arms 21 arranged parallel with the arms 16 and 18 but slightly shorter than said arms. The arms 21 are similarly slotted at their outer ends like the arms 16 and 18.

The automobile in the present instance, is provided with single head-light designated by the reference letter B suitably supported by the brackets D. Each side of the bracket carries an arm 29 which constitute supports for the two-way guide members 30. A pair of slides as shown in Figs. 4 and 5 and designated 31 and 32, is provided and each consists of the frame 33 adapted to slide in the guides 30. Each of the frames 33 is provided with a lens or glass 34 preferably translucent while the central portion of each glass 34 is provided with an indicating hand and letter 35, preferably of transparent material, to designate the contemplated direction of travel of the vehicle. The slides are each provided at their lower ends with stub-shafts 36 to be received in the elongated slots 17 formed in the arms 16, 18 and 21. When it is desired to turn the machine in either direction, to warn other drivers or pedestrians of the contemplated change in direction of travel, either one of the levers 12 or 20 is operated to move the slides 31 and 32 into position to intercept the light rays of the lamps B. Should it be desired to turn the machine to the left, the operating lever 12 is moved rearwardly and during such movement, elevates the forward end of the arms 16 and 18, which arms carry at their outer ends the slide 32. This slide is moved upwardly in the guide 30 and positioned directly in front of the lamp B. When it is desired to move the slide 31 to indicate the direction of travel to the right, the lever 20 is moved rearwardly and moving with said lever is the sleeve member 19 which elevates at their forward ends the arms 21, thereby moving in the guide 30 the slide 31 into position in front of the lamp B, and shifts the slide 31 containing the indicating hand, and letter R to position in front of the rear lamp C.

It is believed from the above description and operation that the invention will be clearly evident.

While I have shown and described the preferred embodiment of my invention, I do not wish to confine myself thereto as various forms, modifications and arrangement of parts may be had without departing from the spirit and scope of the invention as claimed.

What I claim as new and desire to secure by Letters Patent is:—

The combination with an automobile, of a signaling device comprising a lamp, vertical guides supported adjacent to the lamp, signal slides movable in said guides, and provided with laterally-projecting stub shafts, a shaft disposed transversely of the machine frame, a sleeve mounted on said shaft, a pair of arms secured at their rear ends to said shaft, a second pair of arms secured at their rear ends to said sleeve, levers secured respectively to said shaft and sleeve, the forward ends of each of said arms being formed with elongated slots to receive said stub shafts.

In testimony whereof I affix my signature in presence of two witnesses.

THOMAS MOCYDLARZ.

Witnesses:
CHAS. O. SURGEON,
ARTHUR ERNEST POPPLE.

Copies of this patent may be obtained for five cents each, by addressing the "Commissioner of Patents, Washington, D. C."